DIGITAL-MAGNETIC DEFLECTION WITH UNREGULATED DEFLECTION COIL SUPPLY VOLTAGE
Filed June 14, 1963
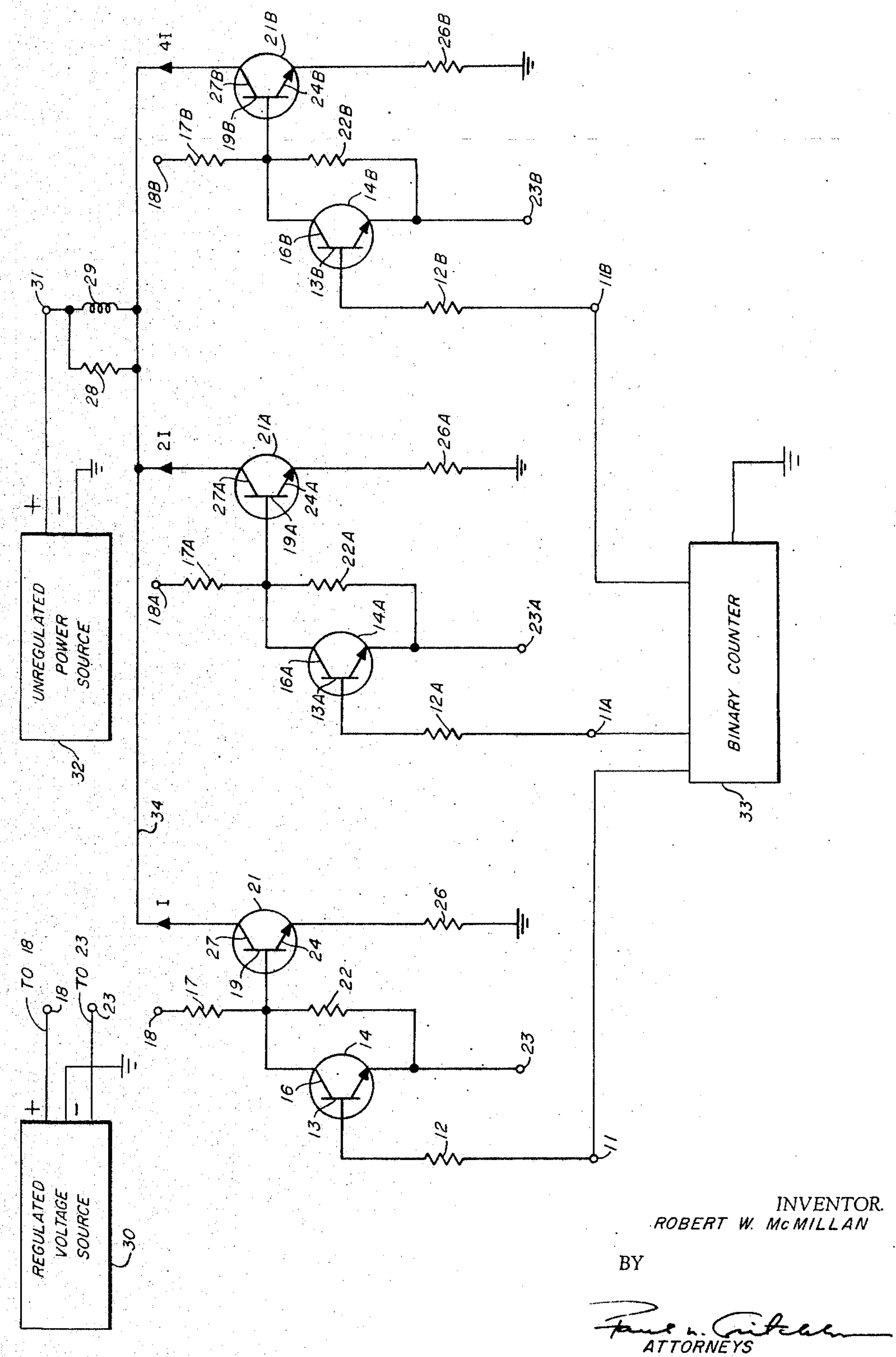
INVENTOR.
ROBERT W. McMILLAN
BY
ATTORNEYS United States Patent Office 3,299,315
Patented Jan. 17, 1967

3,299,315
DIGITAL-MAGNETIC DEFLECTION WITH UNREGULATED DEFLECTION COIL SUPPLY VOLTAGE

Robert W. McMillan, Orlando, Fla., assignor, by mesne assignments, to the United States of America as represented by the Secretary of the Navy

Filed June 14, 1963, Ser. No. 288,056
1 Claim. (Cl. 315—27)

The present invention relates to a digital-magnetic deflection system for deflecting a cathode ray tube beam and more particularly to a digital-magnetic deflection system in which the digital-to-analogue conversion and deflection functions are combined.

The prior art digital-magnetic deflection systems utilizing a binary coded input have required a digital-to-analogue converter, a summing amplifier and a deflection amplifier prior to a signal entering the deflection coils of the cathode ray tube. These systems have been expensive, cumbersome, and have required excessive maintenance and adjustments to insure the accuracy of the deflection current through the deflection coils in precision applications.

According to the invention, a single deflection coil is driven by a resistance ladder comprising a plurality of constant current devices such as transistors, each representing a binary digit, connected in parallel between the bus bars of the ladder. The constant current devices have switching means at their inputs, which are in turn fed from the different binary inputs, resulting in a definite, precise binary count through the deflection coil in response to a given coded binary input to the system. Since the deflection coil is driven by constant current devices, the deflection voltage need not be highly regulated, but only the smaller control voltages applied to the constant current devices. Hence, once the current to each constant current device has been set to its individual binary value, no further adjustment is required in the entire system.

It is an object of the present invention to provide a digital-magnetic deflection system in which the necessity for separate summing amplifiers and deflection amplifiers is obviated.

Another object of the present invention is the provision of a digital-magnetic deflection system in which the deflection coil supply voltage need not be regulated.

A further object of the invention is to provide a digital-magnetic deflection system which consumes a minimum of electrical power.

Still another object of the invention is to provide a digital-magnetic deflection system which is simple, inexpensive and requires a minimum of maintenance and adjustment.

Other objects and many of the attendant advantages of this invention will be readily appreciated as the same becomes better understood by reference to the following detailed description when considered in conjunction with the accompanying drawing wherein like reference numerals designate like parts throughout the figures thereof and wherein:

The sole figure illustrates in schematic form a preferred embodiment of the present invention.

Referring to the drawing, input terminals 11, 11*a* and 11*b* are connected through resistances 12, 12*a* and 12*b* respectively to base elements 13, 13*a* and 13*b*, respectively, of transistors 14, 14*a* and 14*b*, respectively. Transistors 14, 14*a* and 14*b* have collectors 16, 16*a* and 16*b*, respectively, connected through resistances 17, 17*a* and 17*b*, respectively, to positive voltage terminals 18, 18*a* and 18*b*, respectively, of regulated voltage source 30. Collectors 16, 16*a* and 16*b* are also connected to base elements 19, 19*a* and 19*b*, respectively, of transistors 21, 21*a* and 21*b*, respectively, and through resistances 22, 22*a* and 22*b*, respectively, to negative voltage terminals 23, 23*a* and 23*b*, respectively, of source 30. Emitters 24, 24*a* and 24*b* of transistors 21, 21*a* and 21*b*, respectively, are connected through resistances 26, 26*a* and 26*b*, respectively, to ground. Collectors 27, 27*a* and 27*b* of transistors 21, 21*a* and 21*b*, respectively, are all connected in parallel to bus bars 34 and hence through resistance 28 and deflection coil 29 to positive voltage terminal 31, of the unregulated voltage source 32. In the example shown, the second bus of the resistance ladder is ground.

*Operation*

Assuming a binary coded digital signal, which can be taken directly from the output of the conventional binary counter 33, is applied to input terminals 11, 11*a* and 11*b*, the operation of the circuit will now be described. It is emphasized here that while three inputs for three significant binary bits are shown together with their associated circuitry any number of inputs can be implemented by merely reproducing the circuitry shown. The system as shown will handle binary digits 1, 2, and 4 for a total count of 8. If another circuit were added the total count would then be 16. As is well known by those skilled in the digital computer art, the inputs at 11, 11*a* and 11*b* will be pulses which will appear according to the binary count, i.e., for a count of 1, input terminal 11 will have a signal; for a count of 2, input terminal 11*a* will have a signal; for a count of 3, input terminals 11 and 11*a* will have a signal; for a count of 4, input terminal 11*b* will have a signal; etc. Quiescently, the transistors 14, 14*a* and 14*b* are all heavily conducting, which drops the voltage at the junction of resistances 17, 22; 17*a*, 22*a*; and 17*b*, 22*b*, respectively, to cut-off transistors 21, 21*a* and 21*b*, respectively, allowing no collector current to flow through deflection coil 29. Hence, when a negative binary signal is applied at input terminal 11, which in turn is applied to the base 13 of transistor 14, transistor 14 will be cut-off, and the bias divider comprising resistances 17, 22 and 26 will allow transistor 21 to conduct an amplitude of current which is set by the aforementioned bias network. Thus, transistor 21 will then conduct a current I (as indicated) through deflection coil 29 which will represent one increment of deflection or a binary count of 1.

When a negative pulse corresponding to the binary digit 2 is applied at input terminal 11*a* (there being no input at this time to terminals 11 and 11*b*) transistor 14*a* will then be cut-off as transistor 14 was, allowing transistor 21*a* to conduct through deflection coil 29. Since this represents a binary count of 2, the bias network of transistor 21*a*, i.e. resistances 17*a*, 22*a* and 26*a*, are set for a collector current of 2I flowing through transistor 21*a*. This, of course, doubles the current through deflection coil 29 for a binary count of 2. If both input terminals 11 and 11*a* are provided with negative inputs indicating a binary count of 3, the total current flowing through deflection coil 29 will be 3I or the addition of the two collector currents flowing in transistors 21 and 21*a*.

Likewise for a binary count of 4 an input is supplied to input terminal 11*b*, cutting off transistor 14*b* and turning on transistor 21*b*. In this instance the bias network of transistor 21*b*, i.e. resistances 17*b*, 22*b* and 26*b*, are set for a collector current through transistor 21*b* or 4I for a deflection current through deflection coil 29 corresponding to a binary count of 4.

Since the parameter which determines the amplitude of current flowing through any one transistor is the bias current, the only supply that need be regulated is the supply applied to terminals 23 and 18. The only precision components required will be the bias dividing network, i.e. resistances 17, 22 and 26, 17*a*, 22*a* and 26*a*, and resistances 17*b*, 22*b* and 26*b*. These resistances, together with the supply voltage between 23 and 18, control, very accurately, the current flowing through their associated deflection coil driving transistors and hence the total deflection current flowing through deflection coil 29. This feature is important from an economy and operational standpoint in that the supply between 23 and 18 is a low current supply and easily regulated as opposed to the supply applied between ground and terminal 31, which must supply the heavy deflection current through deflection coil 29.

In conclusion, a simple and inexpensive, but extremely reliable and accurate digital-magnetic deflection system has been disclosed which requires a minimum of maintenance and calibration.

It should be understood, of course, that the foregoing disclosure relates to only a preferred embodiment of the invention and that it is intended to cover all changes and modifications of the example of the invention herein chosen for the purpose of the disclosure which do not constitute departures from the spirit and scope of the invention.

What is claimed is:

In combination, a digital-to-analog current converter and a magnetic deflection yoke of a cathode ray tube, said combination comprising;

a resistance ladder network comprising a plurality of parallel constant current circuits connected between the bus bars of the ladder, said deflection yoke being connected in series with an unregulated direct-current power source across the bars of said ladder, each of said constant current circuits comprising a resistor and the collector-emitter path of a transistor with a base electrode for establishing the impedance of each path, means for applying between each base electrode and reference ground a binary bias voltage to switch each transistor between cut-off and a predetermined conduction current, the predetermined conduction current of each transistor being twice the predetermined conduction current of the next transistor corresponding to the powers-of-two series of numbers 1, 2, 4 . . . *n*, said means comprising a voltage divider connected across a fixed regulated voltage source with a mid tap connected to said base, switch means connected to said divider to selectively switch the voltage of said mid tap and connected base between said cut-off and said predetermined conduction current, and a source of binary coded voltages with separate leads for the different significant bits of the coded voltages connected, respectively, to and operating said switch means.

References Cited by the Examiner

UNITED STATES PATENTS

| | | | |
|---|---|---|---|
| 2,810,860 | 10/1957 | Mork | 315—27 |
| 2,956,272 | 10/1960 | Cohler | 340—347 |

OTHER REFERENCES

Hurley, Richard B.: Junction Transistor Electronics, 1958; pp. 400–403.

DAVID G. REDINBAUGH, *Primary Examiner.*

T. A. GALLAGHER, *Assistant Examiner.*